United States Patent Office 3,255,024
Patented June 7, 1966

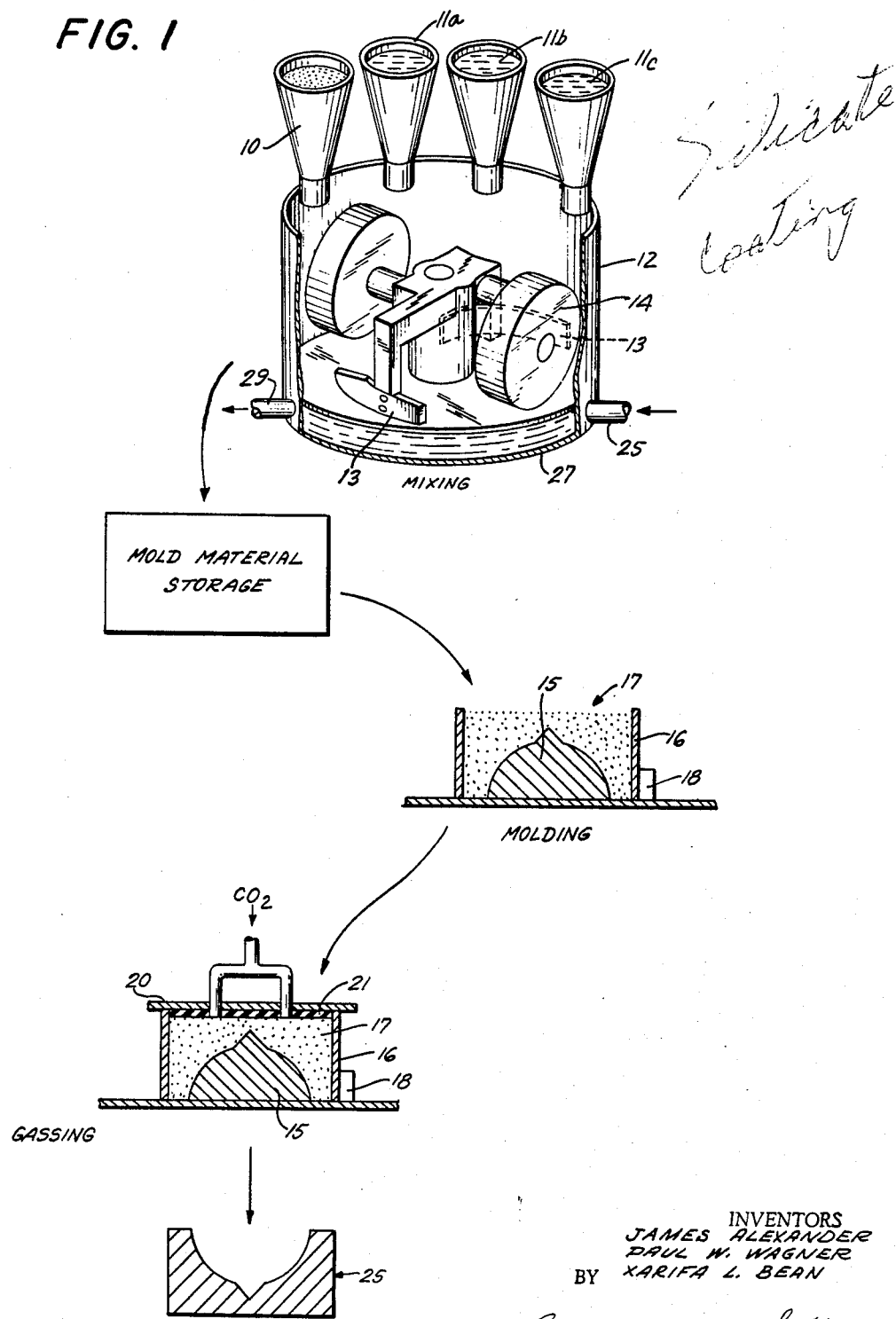

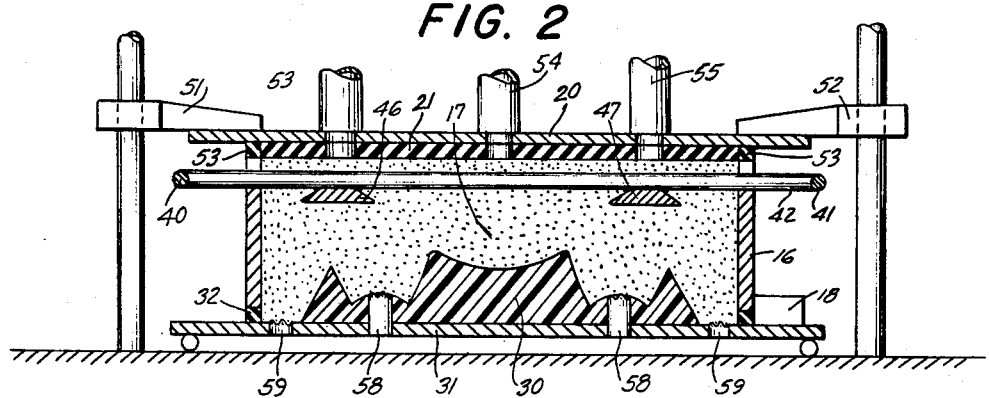
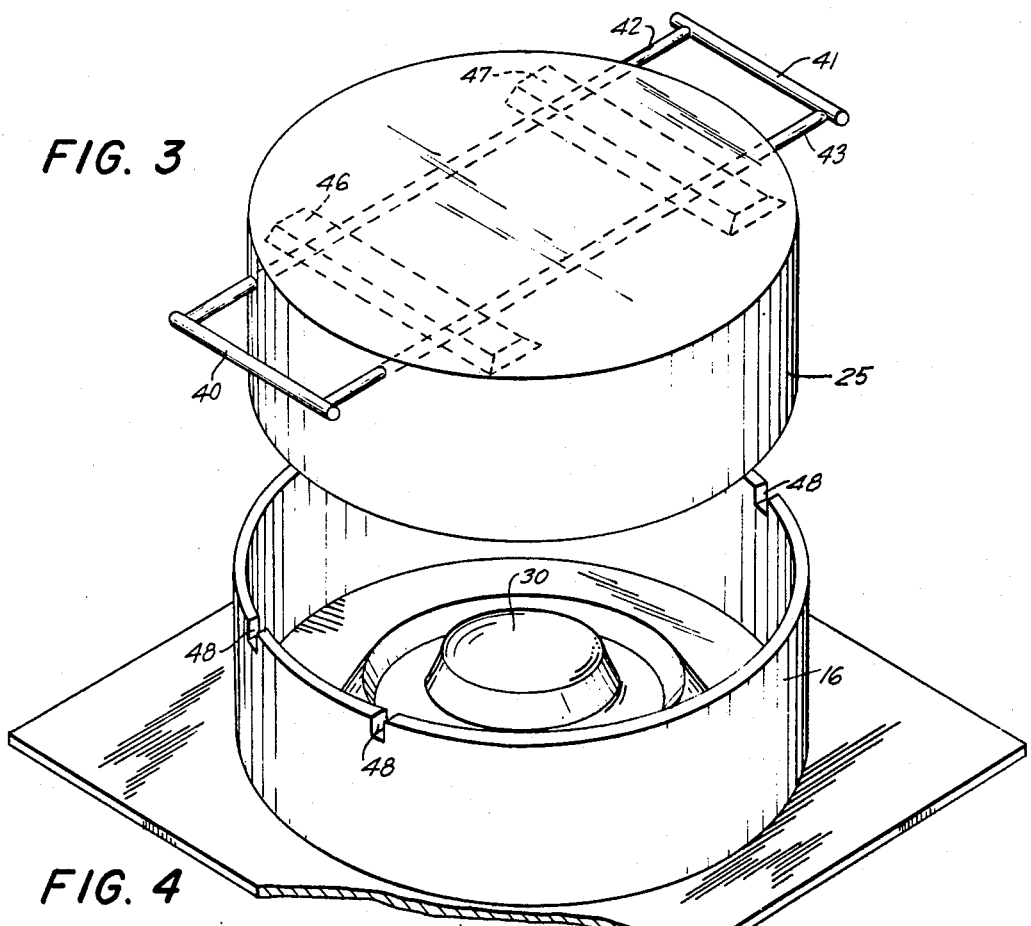
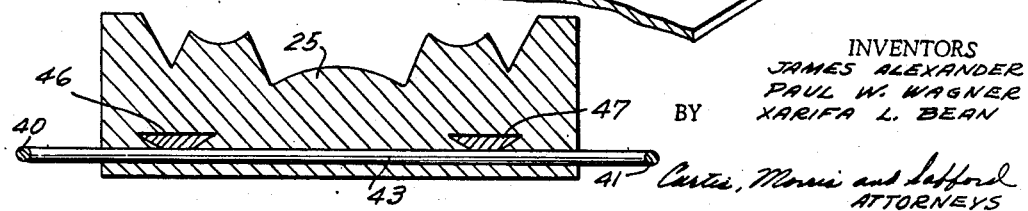
INVENTORS
JAMES ALEXANDER
PAUL W. WAGNER
XARIFA L. BEAN
BY
*Curtis, Morris and Safford*
ATTORNEYS

3,255,024
MOLDING COMPOSITION AND METHOD
James G. Alexander, Paul W. Wagner, and Xarifa L. Bean, Yellow Springs, Ohio, assignors to Morris Bean & Company, Yellow Springs, Ohio
Filed July 6, 1962, Ser. No. 208,083
32 Claims. (Cl. 106—38.3)

This application is a continuation-in-part of copending application Serial Number 812,324, filed May 11, 1959, now Patent Number 3,074,802.

This invention relates to molding compositions and methods for use in the foundry art for making molds for metal casting and, more particularly, to mold-making materials and processes involving granular refractory materials coated with an essentially dry but hydrated silicate binder adapted to be activated to form a firm adhesive bond among the refractory grains by reaction with a gas such as carbon dioxide.

In the above-mentioned copending application there are disclosed teachings for producing a mass of silicate-coated granular refractory material in such manner that the refractory mass and the individual coated grains thereof are essentially dry, free-flowing, and pourable so as readily to flow over and conform to the surface configurations and interstices of a pattern in the making of a casting mold thereof so that an accurate mold reproduction of the pattern surface is readily obtained substantially without ramming or other special techniques which may be necessary in the utilization of granular mold materials which are damp or otherwise not completely free-flowing. After the silicate-coated refractory is formed on the pattern surface, it is subjected to gassing with carbon dioxide for reaction with the silicate binder on the refractory grains to activate the dry binder to adhesiveness (as by releasing bound water of hydration therefrom), thereby bonding the refractory grains together into a firm and solid self-sustaining casting mold structure of substantial tensile and compressive strength.

In the utilization of such teachings in actual commercial practice, it has been found that some difficulties or variations in optimum results may be experienced by varying certain of the factors or features of the compositions or techniques originally disclosed, and that more preferred or enhanced results, ease of operation in commercial production, increased economies of substantial significance, and practical broadening of the versatility of such processes are to be achieved in accordance with the teachings hereof and by operations utilizing the improved techniques and composition ranges in accordance herewith.

For example, considering alkali metal silicates as the binder material, the above copending application includes teachings relating to variations in characteristics of the binders such as bond strength, dimensional stability, etc., in terms of the ratios of metal oxide to silicic acid in the particular silicate compositions utilized. From such teachings, one may conclude a preference for silicate compositions in the more highly alkaline portions of the range of alkali-acid ratios. It may be highly preferable, however, and especially in large scale commercial operations, to reorient the selection of the particular criteria or characteristics to be maximized in the utilization of compositions and techniques of the character to which the copending application generally relates. Thus, in accordance with the teachings hereof, hydrated silicate binder compositions having lower alkalinity ratios of alkali to acid may be preferred as producing an overall or net enhancement of economy, operating ease, versatility, etc., whether or not there is a concomitant partial compromise regarding the particular characteristics of bond strength or dimensional stability in the molding and casting steps.

Moreover, although the silicate-sand coating ratios of the copending application and the particular mixing and gassing techniques indicated as preferred therein are still to be considered appropriate for the designated silicate compositions, particularly surprising improvements and enhancements in the total effect obtainable by varying a number of factors in accordance with the teachings hereof have been discovered. The enhanced results attributable hereto have been achieved by the careful and controlled coordination and correlation of specific dependent and independent variables—such as alkali-acid ratios, mixing techniques, amount of bound water, binder-sand ratios, mixing temperatures, gassing times and techniques, etc.—all within the general area to which the copending application relates but all correlated in accordance herewith for unexpectedly enhanced results for commercial and high production operations within the particular areas or ranges or techniques embodying this invention. Also, in instances where some of the teachings hereof require compromise as to factors such as dimensional stability to gain an advantage in some other direction, such compromise is compensated for by additional new techniques in accordance herewith.

According to this invention, techniques are provided for the manufacture of foundry casting molds of the character described and of enhanced versatility, generally by correlating a variety of dependently and independently varying factors or considerations for maximized or optimum operation, among which factors may be included utilizing silicate compositions of lower than maximum alkalinity and having originally no more than the maximum amount of bound water of hydration, mixing the sand for coating and hydration thereof substantially in the absence of high temperatures, utilizing lower binder-sand weight ratios, gassing at lower pressures and in the presence of atmospheric air, using certain reactive or inert filler materials for controlling dimensional variations perhaps resulting from the selection of a specific desired value for one or the other of the foregoing factors, utilizing mold forming techniques to control or eliminate other inherent dimensional variations or instabilities, operating at generally lower temperatures commensurate with satisfactory utilization of a wider variety of pattern materials, etc.

One object of this invention is to provide materials and compositions and methods particularly adapted to commercial scale or mass production of silicate bonded refractory foundry molds formed on a pattern with essentially dry and free-flowing coated refractory grains. Thus, there are provided a simplicity and speed of gassing or bonding techniques or apparatus at minimum gassing times and quantities to give an adequate or reasonable bonded strength for handling the mold after gassing, yet high dimensional accuracy and stability and a certain controlled slight plasticity as an aid in separation of the mold from the pattern after gassing, a minimum temperature rise during gassing within a range easily accommodated without damage by a wide variety of pattern materials, enhanced stability of the coated refractory material after coating but during storage under atmospheric conditions prior to use, satisfactory utilization of less binder materials for economic and other reasons, simplicity of mixing and coating techniques, enhancement of the operating safety and convenience of workers utilizing the materials and techniques, and accommodating the finished mold to withstand the sudden high temperature shocks experienced by the casting of molten metal thereinto without substantial or undesired dimensional variation during the making of a metal casting.

Another object of this invention is to eliminate or control or compensate for certain difficulties or inconveniences inevitably inherent in the response or reactivity encountered in the coating and gassing and handling of the silicate-coated refractory materials, and including undesired corrosiveness at highly alkaline ratios (affecting both the workers handling the material and mold patterns made of metal), hygroscopicity and similar characteristics of the coated refractory during storage and prior to use, excessive brittleness of the silicate bond (particularly when such brittleness tends to complicate the ease of separation of the finished mold from an intricate pattern), high temperatures developed in the gassing step (having an adverse or undesired effect on some materials otherwise desirable for making patterns), excessively long gassing times or undesirably complex gassing apparatus (perhaps involving a special gas chamber and/or the need for evacuation thereof, etc.).

Other objects and advantages of this invention will be apparent from the following description, the accompanying drawing, and the appended claims.

In the drawing:

FIG. 1 is a schematic or diagrammatic flow sheet representation indicating or illustrating various process steps and apparatus embodying and for practicing this invention;

FIG. 2 is a somewhat diagrammatic view in vertical section of molding material in apparatus for forming a mold over a pattern in accordance herewith and during the gassing step;

FIG. 3 is a perspective view of a finished mold embodying and for practicing this invention as removed from a pattern and flask in which the mold was formed and gassed; and FIG. 4 is a somewhat diagrammatic vertical section through the mold of FIG. 3 as inverted and ready to receive molten metal cast thereinto.

Referring to the drawings, in which like reference characters refer to like parts throughout the several views thereof, various operations embodying and for practicing a preferred example of this invention are indicated in FIG. 1. Thus, a satisfactory molding composition is initially prepared by admixing a granular refractory material with a silicate binder material for coating and hydration thereof on the individual grains to produce the desired essentially dry and free-flowing composition. A granular refractory such as sand is drawn from a supply thereof indicated at 10, while the various binder material components are mixed therewith from sources 11a, 11b, 11c, etc., with coating of the individual sand grains with the silicate binder and the hydration thereof on the grains, in a mixing device indicated generally as a muller 12 or such other mixing apparatus as will intimately admix the binder materials (in liquid form) with the granular refractory, advantageously coating the individual grains with liquid binder, drying the coatings with hydration of the silicate materials, breaking up agglomerates during the drying time, etc. As well understood and as schematically indicated in the drawing, muller 12 includes a "plow" 13 for turning the material and rollers 14 rotating within the muller in known manner.

After mixing and drying and reaction are complete, the dry molding composition may be stored prior to use, as indicated, and with the compositions embodying this invention permitting storing for at least a day or so after coating and prior to use without the undesired caking or formation of lumps or agglomerates, etc., as resulting from reaction with moisture or carbon dioxide in the atmosphere. One of the important obejctives for satisfactory molding compositions of this invention is that, at the time of use, such coated refractory grains shall be essentially free-flowing and pourable, and have substantially no measurable "green strength" so that the grains are individually free to move on or over each other when poured onto a pattern so as to conform faithfully to the true surface of the pattern and all interstices therein merely under the force of gravity alone or as aided by a vibrator, or jolter.

The initial formation of such molding compositions into a mold according to this invention (as indicated by the legend "MOLDING" in FIG. 1) is accomplished by placing a conventional pattern 15 in a foundry flask or other container 16 and pouring the coated molding composition, indicated at 17, over the pattern to fill the flask. As suggested above, flask 16 and its contents may be subjected to vibration, tapping, or shaking for compacting the molding composition 17, as by a conventional vibrator indicated at 18. Advantageously, the molding composition has such free flowability as faithfully to conform to and reproduce the surface of pattern 15, to fill all crevices therein, and to gain sufficient density in flask 16 without ramming, blowing, or tamping, the refractory grains onto the pattern.

After the mass 17 of molding composition is introduced into flask 16 and over and around the pattern therein, the "GASSING" step is performed with carbon dioxide gas being flowed through the refractory mass, as by introducing it through a top plate or cover 20 for flask 16 so that the carbon dioxide permeates all through the refractory mass 17 for reaction with the silicate binder on the individual grains thereof to release bound water of hydration or otherwise activate the silicate into an adhesiveness to form the desired firm bond among the individual refractory grains at the various points of contact thereof to produce a desirably cohesive and self-sustaining mold, which is then removed from the flask 16 and pattern 15 to be ready to receive molten metal cast thereinto in finished form generally indicated at 25. Preferably, as described in more detail below, a rubber cushion layer or mat 21 is introduced on top of the granular material 17 in flask 16 and beneath top plate 20 for maintaining a certain pressure on the granular mass during gassing. Also as described below, it may be desired to arrange a cooling arrangement for the bottom plate for the bottom of muller 12 such as is indicated very diagrammatically in FIG. 1 comprising a water jacket 27 with inlet 28 and outlet 29 for the circulation of water or other coolant therethrough.

As appears in more detail in FIG. 2, there is somewhat diagrammatically illustrated an arrangement of apparatus for practicing this invention and as illustrating the gassing step hereof. Thus, pattern 30 is shown as positioned on a pattern plate 31, with flask 16 positioned therearound. Preferably, a rubber gasket indicated at 32 is interposed between the bottom edge of flask 16 and pattern plate 31. A mass of coated granular molding material, indicated at 17, is poured into flask 16 and around pattern 30 therein, and a vibrator 18 is provided for shaking or vibrating the entire arrangement for compacting the molding material 17. Before flask 16 is completely filled, a handle structure is inserted in the flask.

Such structure is illustrated as comprising handles 40 and 41 affixed at opposite ends to two bars 42 and 43 of a length greater than the transverse dimension of flask 16. Several flat crosspieces 46 and 47 are affixed across bars 42 and 43 and in an area thereof so as to be included within flask 16, and, if desired, openings such as 48 are provided in the upper edges of flask 16 so as to accommodate the handle structure 40–43 across the flask and below the top edge thereof as indicated in the drawings. As described below, with such handle structure in the position shown in FIG. 2 and with sand poured over and around bars 42, 43 and crosspieces 46, 47, when the entire mass of mold material is set to cohesive or hard finished condition, the handle structure will be imbedded therein and provide a convenient manner for lifting and handling the finished mold as it is removed from flask 16 (see FIGS. 3 and 4).

With the molding material filling flask 16 and appropriately compacted therein under the action of vibrator 18, a rubber pad 21 is placed on top of the compacted mass 17, with pad 21 being of a size which will not overlie the top edges of flask 16. Thereafter gassing plate 20 is placed on the assembly, and the whole clamped tightly together in any convenient manner such as is indicated in the drawing by clamp arrangement 51 and 52. Preferably rubber gaskets 53 are also interposed between the upper edge of flask 16 and gassing plate 20, and the clamping force of clamp 51 and 52 is preferably sufficient to exert a firm but resilient force on the top of the mass of molding material 17 by rubber pad 21, for the reasons described in more detail below.

As noted, gassing plate 20 (and rubber pad 21 thereunder) includes a plurality of gas inlet openings having gas conduits thereto, as indicated at 54, 55 and 56 in FIG. 2, through which conduits and openings carbon dioxide is introduced for activating the silicate binder on the refractory granules of molding material 17 to form the desired cohesive bond. As an aid in the proper and uniform gassing of the entire mass of molding material with the carbon dioxide entering the arrangement through gassing plate 20 and in the absence of previous evacuation of air from the mass of molding material, a plurality of vents 58 are preferably provided through the pattern 30 and pattern plate 31 for the escape of air and excess carbon dioxide, and similar vents 59 may be provided in the pattern plate 31 itself and beyond the area of pattern 30. Such vent openings 58 and 59 preferably include a grid over the inner end thereof to prevent passage of sand therethrough, and are positioned and disposed on pattern 30 depending upon the particular configuration thereof so as most readily to prevent undesired entrapment of air or carbon dioxide in or under portions of the pattern—all in known and well-understood manner as similar vents are provided in foundry patterns for use in making sand molds with sand blowing equipment.

With the foregoing arrangement and assembly, carbon dioxide gas introduced through conduits 54–56 and permitted to flow through and permeate the entire mass 17 of silicate-coated molding material for the activation of the silicate coatings on the individual grains thereof to form from the originally loose mass of molding granules 17 a firm and cohesive self-sustaining mold. Upon completion of the gassing, gassing plate 20 and rubber pad 21 are removed, and the finished mold lifted out of flask 16 and off pattern 30 (as indicated in FIG. 3) by means of handles 40 and 41. The mold, now substantially complete, is then inverted (as in FIG. 4) and positioned or conveyed to the foundry site for receiving molten metal to form the desired casting as a reproduction of pattern 30. If interfitting cope and drag mold parts are desired for a particular casting operation, it will be understood from the foregoing that such separate mold parts are also satisfactorily provided in accordance herewith for proper interfitting register simply by proper orientation of the respective patterns within the respective flasks so that the mold cavities formed thereby in both cope and drag portions will coincide when the two parts are placed together. Similarly, upon removal of the finished mold as in FIG. 3, the flask 16 and pattern 30 therein are immediately ready for the production of a succeeding mold from the same pattern by a repetition of the steps as explained above.

As will be apparent, the utilization of the foregoing steps or techniques effects some rather surprising and unexpected economies and enhancements in ease of handling, especially from the standpoint of large scale commercial production and particularly as compared with the arrangements disclosed in the copending application as preferred for the compositions and techniques thereof. It is believed that many of such economies or improvements here result specifically from the instant development of new or different compositions and operating techniques and conditions particularly adapted or applicable to the utilization of silicate binder materials having substantially less alkaline ratios of metal oxide to silicic acid portions in the hydrated silicate binder, as well as enhancing or extending the versatility of mold-making techniques in accordance as herewith applicable to a variety of different metals to be cast and the different founding conditions encountered therewith (e.g., the widely different melting temperatures of aluminum as compared to iron and the different effects of such temperatures on factors such as dimensional stability or expansion warping of the mold during the metal casting operation).

As noted above and in the copending application, silicate binder materials in the higher alkalinity ranges may present certain advantages from the standpoint of bond strength formed, accurate dimensional reproduction, and the like, while materials in the lower alkalinity ranges, while less advantageous regarding those factors, present certain other advantages such as ease of solution for the coating step, less hygroscopicity in storage and use, etc. In dealing with these various materials, and even if it is attempted to maximize only such factors as bond strength and dimensional stability, such a variety of dependent and independent variables is encountered in connection with the coating, molding, and gassing of the various compositions, that these materials are not to be considered merely as simple alternatives, nor are the preferred techniques for forming and using the high alkaline silicates as compared with those of lower alkalinity ratios.

Thus, whereas the more highly alkaline materials may produce greater bond strengths initially, especially when larger ratios of binder to sand are used, there may result concomitant disadvantages such as excessive corrosiveness resulting from the higher alkalinity, less desirable working conditions, greater water pick-up during storage from moisture in the air, a temperature rise during gassing adversely affecting pattern materials, and a final brittleness of the mold which may greatly complicate separating the mold from the pattern without breaking corners of the mold cavity. Similarly, attempting to utilize binder-sand ratios of about 10% binder may unnecessarily complicate the mixing and the coating steps in the first place. With the higher alkalinity materials, perhaps because of the brittleness of the bond formed, somewhat higher binder-sand ratios may be desired in order that the resulting bond, because it is brittle, shall be stronger than might be satisfactory with a less brittle finished mold. Since the binder coating on the sand grains is desired to be a dry solid after coating, yet must be a liquid in order to coat the grains in the first place, including larger binder-sand ratios in the coating step may require heating the binder material in order to maintain sufficient fluidity adequately to coat each of the grains, especially if all of the silicate binder is added together all at once during the coating operation. The utilization of such a mixing or coating technique with less alkaline materials and, especially, at lower binder-sand ratios, may result in loss of some of the desired bound water of hydration during the coating step. Somewhat the same considerations may be encountered if the initial viscosity control of the silicate material is attempted to be accomplished by dilution with subsequent heat drying to drive off free water.

Furthermore, there appears to be a substantial difference in the variety or character of bond obtained, after gassing, as between lower and higher alkalinity silicate materials. At the lower alkalinity ranges, there is developed a bond with slight but definite plastic character which is advantageous in separating the finished mold from the pattern by minimizing the care and accuracy necessary to withdraw the mold from the flask in a perfectly straight line without breaking edges or corners of the mold cavity. Nevertheless, such plastic quality must be associated with enough bond strength in the finished mold to make a good workable product, and cannot be satisfactorily achieved merely by a general diminution of ultimate bond strength, although some compromise is permissible. Thus, in the more highly alkaline ranges, the gassed and activated silicate material provides a rather weak bond when the bond includes any appreciably plastic character, especially if the plasticity of the bond is attributable to an excess of activating moisture, in a manner whereby it may be necessary to advance the bonding (by prolonged gassing) to a condition where it is strong but brittle in order to accomplish successfully the step of withdrawing the finished mold from the pattern.

It is believed, over all the alkalinity ratios, that the formation of the activated silicate bond proceeds in a somewhat stepwise fashion during gassing, with the coated sand first becoming wet as water of hydration is released by reaction with carbon dioxide, and then gradually developing strength as the reaction proceeds. At the higher alkalinity ratios (and especially with higher binder-sand ratios), the initial release of water of hydration in the early stages of gassing may be so extensive as to produce quite a wet condition in the mass of coated sand, which condition produces plasticity, but not much strength. With continued gassing and/or reaction, a stronger bond develops and passes through an intermediate stage in which there is noted substantial bond strength accompanied by a certain desired plasticity. At the higher alkalinity ranges, this intermediate stage, during which the mold may be most readily removed from the pattern, may be unsatisfactorily short or may require additional gassing to accomplish the final set condition so that it is not expedient to remove the mold from the gassing step or the pattern at that time. Similarly, the higher alkalinity ratios may result in a greater production of sodium carbonates during the gassing step which themselves cause additional brittleness in the final bond.

At the lower alkalinity ratios in accordance herewith, by contrast, and with appropriate control of the amount of water of hydration available, the intermediate or plastic-but-strong stage of bonding extends for an appreciable period during the gassing step, during which gassing may be stopped and the mold removed from the pattern with sufficient strength for use or with the reaction sufficiently progressed to eventual termination as not to require further gassing. Indeed, optimum results are achieved in accordance herewith by controlling and limiting the gassing to less than that which quickly and completely sets or reacts the binder to an ultimate brittle condition as could be accomplished if the gassing step were prolonged unnecessarily. Similarly, control of the amount of water of hydration is important in the foregoing connection, in that too much may indicate a sacrifice of strength during the intermediate or plastic stage, while with too little the desired plastic character may not be sufficiently definite or prolonged for optimum results or ease of handling.

Additionally, as will be understood from the foregoing, effective gassing times may be longer, and, indeed, undesirably longer, for silicate binder materials of higher alkalinity, whereas, in accordance herewith, desirably short gassing times are achieved with the lower alkalinity compositions and even under conditions where the gassing step need not be accomplished in a closed or evacuated chamber or at high gassing pressures, since a greater amount of carbon dioxide is required for reaction with the higher alkalinity materials, in addition to the fact that more binder may also be required to achieve a bond of desired higher strength because of the inherent greater brittleness thereof. Especially with mass production foundry conditions, reducing the necessary duration of gassing time for each mold by a factor of 50% or more may present extremely important commercial or economic advantages such as, for example, permitting a substantial increase in the productivity of production molds from a single pattern by reducing the amount of time that the pattern is tied up in the making of each mold. With such production foundries, for example, filling an order for several thousand identical castings requires the production of several thousand molds, so that the length of time necessary to make each mold from a single pattern may exercise an extremely important economic consideration on the production cost involved in the sense that the finished castings cannot possibly be produced at a rate which is faster than the rate of production of the individual molds therefor.

If one postulates as factors of improved or enhanced commercial desirability the various considerations noted above—e.g., simplicity of gassing under atmospheric conditions and with minimum time, slight plasticity of bond to aid pattern removal step, reduced temperature rise during gassing of no more than about 10 degrees F., enhanced temporary stability of the coated sand before molding and during storage under atmospheric conditions, minimized objectionable handling conditions for operators, reduced requirements for silicate binder material, adequate bond strength for handling the finished mold, dimensional accuracy and stability both during gassing of the mold and later during casting of molten metal thereinto etc.—then it has been discovered that desirable or satisfactory maximizing of the first five of the aforementioned criteria are desirably enhanced primarily by utilization of oxide-acid ratios in the lower alkalinity ranges in accordance herewith, while the other features and teachings hereof contribute not only to the satisfactory utilization of the lower alkalinity binders but also to the enhancement of such materials to produce a coordinated or satisfactorily controlled compromise between the essentially disparate considerations of high bond strength and complete dimensional stability, as noted below.

As illustrative of such lower alkalinity ranges may be noted ratios in the hydrated binder on the refractory grains of sodium oxide to silicon dioxide generally within the range of about 0.8:1.0 to 1.4:1, with a preferred range for commercial operation being about 1:1 to 1.3:1, especially for casting metals such as aluminum and copper. With silicate materials at such alkalinity ratios, and prepared and utilized otherwise in accordance herewith, satisfactory results are achieved when the binder is applied to the sand or other refractory granular material in quantity ranges of about 1.5% to 2% binder solids by weight of coated refractory for molding sand materials having particle sizes corresponding to about A.F.S. fineness #100 (such as Portage 705 sand) and within the range of about 1.0% to 1.5% for a 50 mesh molding sand (such as Ottawa Bond sand). Denser sands such as zircon sand may require about 1.7 times as much binder as silica sand, while less dense carbon sand may require only about ⅔ as much.

As will be understood, an ultimate increase in bond strength may be attributable to increased ratios of binder to sand, at least up to a certain point beyond which additional binder coating no longer improves strength characteristics. On the other hand, undesired dimensional variations of the finished mold (both during the gassing step and later as a result of drastic heating of the mold to a high temperature during the step of casting molten metal thereinto) may increase appreciably with increased amounts of silicate binder material in the molding material mass. That is, thermally induced dimensional variations as well as those resulting from chemical reactions in the binder material and/or variations in the hydrated or water content thereof may occur in the silicate binder coating on the individual sand grains, as well as in the refractory sand itself. Hence, generally, increasing the binder-sand ratios may provide for stronger bonds, while also increasing the undesired tendency for dimensional variations in the mold during storage or gassing or casting. At the various ratios noted in accordance herewith, an optimum or satisfactory compromise between such two disparate conditions is achieved, at least to the extent that strength increases (if any) attributable to increasing the binder content above the noted ranges are not believed to produce practical improvements or advantages commensurate with or offsetting the corresponding and undesired decrease of dimensional accuracy and stability attributable to increased binder contents, while, in some cases, increasing the binder content above the noted ranges (utilizing low alkalinity silicates) may actually show some deterioration in strength properties of the finished mold.

In preparing and utilizing coated sand molding materials in accordance herewith and including such lower quantities of binder at lower alkalinity ranges, a variety of considerations are to be emphasized as of importance in achieving satisfactory results and in properly coordinating the various correlated and independent variables involved to achieve the ultimately desired result. Among these may be noted the importance of avoiding the addition in the mixing step of more water than can be taken up as bound water of hydration by the silicate binder. Especially at the lower alkalinity ratios, if more free water is present during the mixing and hydration step, considerable difficulty may be experienced in removing or drying off such excess of water to the point where the coated sand is effectively dry and free-flowing without also removing therefrom some portion of the desired water of hydration.

In considering the foregoing, however, it must be recalled that the hydrated material desired to be formed as a coating on the refractory granules is, of course, a solid at room temperature, yet, for adequate distribution and coating uniformly over the granules during the mixing step, the binder should be in liquid form. If such liquid condition is attempted to be maintained by a water dilution, a substantial amount of excess water beyond that ultimately bound of water of hydration will be involved. If, on the other hand, the condition of the silicate binder is liquefied by increasing the temperature thereof at the time of addition to the sand, other difficulties may be experienced. For example, within the preferred alkalinity ratios, the temperature of the silicate material may be about 115° F., and is almost immediately cooled by contact with the sand so as to revert to a condition which is difficult to distribute evenly and effectively on the individual sand grains. Since it has been found that the desired coatings of silicate binder material within the preferred ranges lose water of hydration almost instantly at temperatures above about 128° F. and will also lose such bound water in substantial amounts at temperatures above about 110° F., it will be apparent that inconsistent considerations are involved when attempting to produce a desirably hydrated coating on the sand grains utilizing starting materials of adequate fluidity for uniform distribution and coating.

One satisfactory technique in accordance herewith for accomplishing these apparently inconsistent results relates to adding silicate and alkaline materials separately to the sand during the mixing step for reaction thereon and after the originally liquid materials have been adequately and desirably distributed on the individual sand grains. For example, if a silicate material sufficiently silicious to be a liquid or syrup at room temperature (for example, having an oxide-acid ratio of about 1:1.6) is first added to the sand in the muller and distributed thereon, a water solution of sodium hydroxide (of the appropriate alkali concentration to achieve the ultimately desired oxide-acid ratio in the finished binder and containing no more water than will be utilized as water of hydration) can later be added to the muller to react with the original syrupy silicate after it has been distributed over and coated on the individual refractory grains. Which of such separate additions is made first in coating the sand is not of critical importance (although it is preferred in accordance herewith to add the silicate material first), since several minutes are available for complete coating of the individual grains in a conventional muller (such as a Simpson muller) even after an addition of the second reactant and before the desired solid hydrated binder precipitates on the individual sand grains.

Similarly, little, if any, benefit has been produced by increasing the speed or intensity of energy input in the mixing apparatus itself (as by using a conventional speed muller) in view of the fact that increased mixing or working energy inputs promote a similarly increased tendency for loss of bound water of hydration. Actually, as previously described, it is preferred that some provision be made for cooling the sand and binder materials in the muller during mixing thereof—as by water jacket 27 in FIG. 1 to cool the bottom plate of the muller—because the mixing action or reaction in the mixing and coating step may actually cause some rise in sand temperature, while the heat of formation of the crystalline hydrate may produce a further rise of perhaps 8–10° F. Utilization of water in water jacket 27 of approximately 55° F. achieves a satisfactory removal of any such excess heat or temperature rise and maintains generally more continuously uniform conditions during the mixing step to eliminate subsequently noted variations in the strength or other characteristics of the mold material as may occur from one batch to another because of slight variations in temperature and moisture conditions in the mixing apparatus (or even in the mixing room) at these alkalinity ratios.

Merely as illustrative of the teachings hereof, one may note a particular formulation and one preferred mixing technique demonstrative of the various factors and considerations noted above and with which satisfactory results have been achieved in accordance herewith. Such illustrative formulation included 3,000 parts by weight of a fine silica foundry sand (Portage 705, A.F.S. fineness #100) to which was applied a silicate coating made up of the resultant products of the following ingredients: 81.3 parts by weight of a syrupy and highly silicious silicate material (B.W. silicate manufactured by Philadelphia Quartz Co. and having an oxide-acid ratio of about 1:1.6) containing 15.9 parts sodium oxide, 25.3 parts silicon dioxide and 40.1 parts water; 33.6 parts of a 50% sodium hydroxide solution; an additional 16.2 parts of water; and about 2 parts of brown sugar added as a component tending to reduce the tendency of the coated sand to cake during storage.

As illustrative of the mixing technique for the foregoing example, about a third of the sand was dumped into a Simpson muller and, as the muller was started, the extra water was added to the sand with the brown sugar in solution. About two minutes later, the syrupy silicate was added and gradually distributed over and coated on the sand grains as the muller continued to operate. After about seven minutes, the remainder of the sand was added for further intermixing and coating, and after about an additional nine minutes, the sodium hydroxide solution was added. During the continued operation of the muller for an additional 12 or 13 minutes, the hydrated silicate coating on the individual sand grains was formed and the silicate reacted with the sodium hydroxide to produce the ultimately desired hydrated silicate layer on the individual sand grains. After a total of about 20–23 minutes from the start of the muller, the resulting coated sand was dumped and stored as a dry and free-flowing mold material for use herewith. Merely as illustrative, the temperature of the sand when introduced into the muller was at about room temperature (e.g., 70°–75° F.), and, when dumped, the temperature had risen perhaps 20° F., and the sand was ready for immediate use in the molding technique if desired or for storage for a day or so prior to use.

The principal reason for adding only a third of the sand to begin with relates to obtaining a better initial distribution of the syrupy silicate (which, in this example, is fairly viscous) on and over the sand grains. The final coated sand was adequately dry and free-flowing to produce the desired result in pouring the sand on the pattern and compacting it thereon under vibration and gravity forces, and indicated a binder content of about 1.81% silicate solids by weight of the coated sand. The weight of combined water of hydration held by the binder was about 2.56% of the weight of coated sand, and the ratio of sodium oxide to silicon dioxide in the binder was about 1.13:1.

With such coated sand, satisfactory commercial results are achieved in accordance with the mold-making steps noted above, and, indeed, such molding material is readily gassed with carbon dioxide, despite the low alkalinity and low binder-sand ratio, in adequately short periods of time varying from perhaps 30 seconds to 3 minutes, depending on mold size. Throughout the lower alkalinity ranges as preferred here, satisfactory gassing and binding results are achieved at considerably less than a full atmosphere of carbon dioxide pressure during the gassing step, so that it is not necessary that ambient air be evacuated from the mass of coated sand prior to the gassing step, nor, even, that the mold being gassed be enclosed in a gassing chamber or otherwise other than the preferred arrangement noted above involving a gassing plate over the top of the flask. Satisfactory gassing results have been achieved utilizing mixtures of carbon dioxide and air over a fairly wide range of from about 25% carbon dioxide on up to 100% carbon dioxide at approximately atmospheric pressure in the mold, especially if a continuous flow of gas is maintained through the coated sand, as by the provision of vents such as 58 or 59 in the pattern or pattern plate. With apparatus as described above, satisfactory results have been achieved with a pressure of carbon dioxide in the supply conduit of no more than about 2.25 p.s.i.g., to provide a pressure of carbon dioxide under the top gassing plate 20 and over the mass of refractory to be gassed at about 0.5–2 p.s.i.g.

It is desired to control the gassing step in accordance herewith to a limited and nonexcessive duration, both for the purpose of speeding production and to avoid a complete reaction in the gassing step carrying the resulting bond to an excessively brittle form prior to removal of the gassed mold from the pattern. For example, the tensile strengths obtained with techniques and compositions as just described tend to increase somewhat in the first five or ten minutes after the gassing step is complete, so that actual positive flow of carbon dioxide can be arrested at a satisfactory time during the above noted intermediate plastic stage in order to permit easy removal of the mold, and the tensile strength of the bond will, nevertheless, increase after gassing has ceased to present a greater mold strength conveniently by the time the mold has reached a metal pouring location. Such post-gassing strength increases, however, vary somewhat with the duration of the gassing step itself.

For example, a mold gassed for 30 seconds may show a tensile strength of about 5 or 6 p.s.i. within about 2.5 minutes after gassing, but such tensile strength gradually increases to about 23 p.s.i. in about 11 minutes after the end of the gassing step. Similarly, a comparable mold of the same material but gassed initially for 60 seconds demonstrated a tensile strength of about 18 p.s.i. at 2.5 minutes after gassing, and showed a further increase in tensile strength up to about 32 within 7.5 minutes after the gassing step. In a comparable situation with a duration of about 120 seconds for the gassing step, an initial tensile strength of about 21 was indicated 2.5 minutes after gassing, which tensile strength increased but very slightly by 11 minutes after gassing. As will be understood, all of the aforementioned ultimate tensile strengths are more than adequate for the normal requirements of a self-sustaining casting mold for the handling and pouring of molten metal thereinto. In addition to tensile strength, the compressive strength of such molds were achieved in the range of from about 40 to 150 p.s.i. and, accordingly, adequate for a completely satisfactory operation with the casting of either aluminum or iron thereinto.

As noted above, it primarily desired to include in (or add to) the ingredients being mixed in the coating step no more water than will ultimately be utilized as bound water of hydration in the finished and crystalline hydrated binder in order that there is present in the mixing step substantially no free or unbound water which must be dried or otherwise removed in order to produce the desired dry and free-flowing material. At the same time, however, it is desired that the silicate component be added in liquid form for adequate mixing and distribution over the sand grains and, preferably, in a form which is liquid at room temperature to avoid the necessity of any heating which might tend to drive off water of hydration from the finished coating. Silicate materials in highly silicious oxide-acid ratios are available commercially as syrupy liquids at room temperature (such as the material noted above having an initial oxide-acid ratio of about 1:1.6). Other particular ratios may be utilized in accordance herewith provided they are sufficiently silicious to be essentially amorphous and/or syrupy at room temperatures.

For example, oxide-acid ratios approaching the 1:1 range of the metasilicate tend to be essentially crystalline (since the hydrated silicate materials are crystalline) and, thus, difficult to render into liquid condition without undesired heating or dilution with water. As noted, neither of these expedients is preferred. The utilization of silicate ingredients even more silicious than that indicated is appropriate in accordance herewith, provided that, again, sufficient sodium hydroxide can be incorporated in the mixing step to provide the final oxide-acid ratio without the introduction of excessive amounts of water therewith. The sodium hydroxide reactant was added as a 50% solution and, also, should be in liquid form for adequate distribution over the sand grains in the mixing step. As will be understood, it may be impractical to add sodium hydroxide in liquid solutions more concentrated than 50%. If the silicate ingredient is added in a too-silicious form, adding enough sodium hydroxide (as a 50% solution) to achieve the ultimately desired ratios may require adding more water in the sodium hydroxide solution than can ultimately be accommodated as bound water of hydration.

Thus, to achieve ultimate oxide-acid ratios within the above noted range of from about 1:1 to 1.4:1, the hydrates formed on the sand have been found satisfactorily to take up as water of hydration substantially all the water contained in a silicious syrup of a consistency readily coatable at room temperature (e.g., 1:1.6) and in the correspondingly requisite quantity of 50% sodium hydroxide solution, which is also a concentration which is satisfactorily liquid at room temperature for adequate mixing and coating. In the range of final ratios of about 1.05:1 to 1.30:1, some additional free water can also be taken up and bound as water of hydration by the resulting hydrate on the sand particles. Thus, the maximum extra water (above that in the silicious syrup ingredient and the sodium hydroxide solution which can readily be taken up and bound as water of hydration in the ultimately dry hydrated silicate coating on the sand grains appears to be approximately 30% of the weight of the silicate solids in the starting ingredients, but it is not preferred that such extra water be added if the finally desired oxide-acid ratios are outside the range of about 1.1:1 to 1.25:1.

Also as will be understood, the fineness of the sand and the total amount of binder to be incorporated thereon may affect the foregoing considerations, but in minor ways. The above ratios are particularly appropriate in considering the application of the teachings hereof to fine sands (such as the A.S.F. #100) and carrying a finished binder content of approximately 1.8% silicate solids by weight of sand.

As noted above, there are a variety of differently motivated dimensional variations which may be characteristic of the molding materials and techniques in accordance herewith, which variations it may be desired to accommodate with adjustments in compositions and operating conditions in making the mold, rather than attempting to accommodate such inevitable variations initially in a corrective pattern design. Of such dimensional variations or lack of stability, some may result from chemical or other dimensional changes taking place during the gassing step as the originally dry silicate coating on individual sand grains is altered to affect the spacing between adjacent grains of sand. For example, when the sand is first exposed to reaction with carbon dioxide, the water of hydration is primarily released and the coated sand becomes wet. Although this original wetting may produce a significant amount of bonding (as compared to the original dry and free-flowing condition of the sand), the strength has not yet reached even the degree of intermediate plasticity desired for removal of the mold from the pattern as a cohesive and self-sustaining structure. Nevertheless, the initial reaction releasing some of the bound water of hydration and the activation thereby of the previously dry silicate coating on the sand granules produces a dimensional variation or shrinkage even as the silicate coating is being activated to primary adhesiveness, in addition to the fact that released bound water of hydration on the individual sand granules appears to produce a lubricating effect promoting certain settling of the entire mass as compared with the situation before any reaction between the essentially dry hydrated silicate coating on the sand grains and the gaseous reactant.

As illustrative, a mass of the coated sand as noted in the above example and deposited in a box or flask 10 inches deep and compacted therein under the force of gravity as influenced by a vibrator, will drop an amount ranging between 0.1" and 0.05" in the first or wetting stage of the gassing reaction. Similarly, the mass tends to pull itself together laterally unless there is pressure on it and, as will be understood, for somewhat the same reason. For example, the sand at the bottom of such a 10-inch deep box has superimposed thereon the pressure of the overlying sand, but the sand at the top of such a box is subject to no such pressure, and a lateral shrinkage or coalescence of as much as 0.0005" to 0.005" per inch of lateral extent of the mass can actually be measured in the top 3 or 4 inches of the deposited and compacted molding material after gassing.

Nevertheless, and in accordance herewith, such dimensional variations inherent in or motivated by the bonding reaction of the silicate binder with carbon dioxide are readily accommodated in commercial practice. For example, silicate-coated sand as prepared in accordance herewith, possesses a certain effective ability of flow under pressure at this early plastic stage of the bonding reaction, and, of course, the pattern 30 is still in place beneath the mass of sand. Therefore, a certain pressure can be imposed, both downwardly and laterally, on the top of the mass of molding material, so that initial vertical shrinkages are readily compensated for by urging the mass of sand against the pattern surface.

Similarly, lateral shrinkage tendencies in the top several inches of the mass may also be controlled—as by utilizing the pressure pad 21 of sponge rubber or other material within the area of flask 16 and beneath gassing plate 20 to maintain a certain pressure on the mass of coated sand being gassed to accommodate both vertical shrinkages and lateral shrinkages in the top portion thereof. For example, in the 10-inch deep box above noted, a sponge rubber pad of no more than ¾" in thickness under the top gassing plate 20 has produced satisfactory results as imposing an appreciable downward and lateral pressure on the mass of mold material being gassed. It is also appropriate to include in pressure pad 21 not only openings for the passage of carbon dioxide therethrough but also lateral channels, if desired, to aid in the uniform or desired distribution of the activating gas over the top surface of the mass of coated refractory granules.

A further contribution to possible dimensional variations or shrinkages of the molding material, particularly during the gassing step relates to such considerations as the initial density with which the mass of material is compacted over the pattern in the flask and the amount of water of hydration which is liberated in the first stages of gassing and before there occurs even a plastic set to the desired cohesive bond. Both of such sources of dimensional stability in a gassing or bonding reaction stage when the molding mass is still on the pattern are readily accommodated. For example, all varieties of such possible sources of shrinking or dimensional variation of instability during initial gassing stages may vary, despite efforts at correction or accommodation thereof in accordance herewith, as much as 0.003" to 0.0035" per inch of lateral extent in extreme cases; but even such variation, being readily predictable and reproducible, is a dimensional characteristic which may be readily accommodated.

Generally, the least amount of the above noted shrinkages after gassing may be produced with coated sand materials in which the hydrated silicate binder includes an amount of bound water as close as possible to the maximum hydration, although a variety of advantages may be noted, as hereinafter explained, by specifically controlling the amount of bound water to substantially less than the maximum hydration. Such shrinkages may produce a substantially consistent dimensional variation of about 0.001" per inch of mass of coated molding material and most of such post-gassing shrinkage (perhaps 60%–75% thereof) occur in the first few hours after the mold is made, whereas 85%–90% has occurred in the first 24 hours with virtually little, if any, shrinkage changes thereafter. In high production commercial operations, of course, such additional shrinkages may be academic to the extent that the finished molds are used promptly after the completion of the gassing step.

It may also be noted that greater compacting initially in flask 16 (as by more intense vibration) produces a mass of molding material of such density that some or all of the above noted shrinkage conditions may not occur at all or may occur only in the upper portion of the mass above the mold cavity and even without pressure pad 21. As noted below, however, some molds having certain shapes of mold cavities may have a tendency to buckle during casting of the metal thereinto, and such buckling tendency appears to increase with higher density compactness. Thus, a practical compromise may be reached in each instance coordinating increased compacting (producing a mold less permeable and more likely to buckle upon casting and using more coated sand) and less, compacting, on the other hand (producing a more permeable mold with a greater tendency to shrink during or after gassing). In either event, however, such tendencies are controlled or accommodated in accordance herewith, as by mechanical pressure in the gassing step, use of certain types of additive materials, etc.

Under circumstances, however, where such post-gassing shrinkages become significant or of commercial importance, satisfactory results are achieved in accordance herewith in a reduction or minimizing or elimination thereof by the addition of certain additive materials in the original molding composition. For example, a quantity of about 0.1% (of the coated sand weight) of a material such as sodium carbonate added to the original mixture (preferably, in the free water added into the muller) achieves the effect of substantially eliminating such post-gassing shrinkages, although an excess amount of such material (for example, in excess of 0.3%) may interject into the finished composition an excessive expansion effect causing cracks to develop after gassing. As noted below, a variety of other additives, such as the starches, urea, gelatin, and various fibrous products as noted in the original copending application, may be utilized for a variety of different dimensional variation controls in accordance herewith, although satisfactory results have been achieved with the compositions set forth herein and the operational techniques disclosed, even without diluent or inert or other reactant additive materials incorporated into the coated refractory granular molding composition.

Another primary source for undesired dimensional variation in the finished mold is the thermally induced non-uniform or local expansion characteristics engendered during subjecting the finished mold to the sudden high temperatures of pouring molten metal therein to form the desired metal casting. Since the mold produced in accordance herewith is of desirably rigid and cohesively bound self-sustaining character, the gassed and reacted and bound condition thereof is, inevitably, subject to thermally induced dimensional variations during the casting operation, and the effect of such high temperature contact with molten metal poured into the mold produces different results regarding the individual refractory granules, on the one hand, and the gassed and reacted silicate bond thereamong, on the other hand.

For example, for certain types of geometry or configurations of the mold cavity surfaces, especially convex surfaces, some distortions of the mold may be noted during the casting of molten metal thereinto. Particularly with convex surfaces, an inward bulging and even detachment of the surface layer of bonded sand has been noted. Such distortions may occur particularly with the casting of ferrous metals, but to a much less extent in the casting of lower melting metals such as aluminum, and are believed attributable to a thermal expansion of the refractory granules, especially when they are tightly packed in the mold mass, and, to some extent, the amount of water of hydration in the finished and gassed mold, some of which is released at the metal casting interface when contacted by the high temperature molten metal. Even with ferrous casting, such distortions arising from thermal expansion of the refractory granules themselves are readily controlled or eliminated by utilizing refractory materials having particularly low thermal expansion coefficients (such as zircon sand, Olivene sand, sillimanite, carbon sand, etc.) instead of silica sand, but such materials are substantially more expensive than silica sand and, accordingly, may not be preferred for general commercial production and use.

Such expansion effects are also controlled or eliminated, in accordance herewith, by reducing or eliminating the amount of water of hydration in the coated sand originally to somewhat less than the maximum quantity of water which will be held as bound water of hydration by the silicate binder material coated on the individual sand grains. Similarly, and concurrently or alternatively, such thermally induced dimensional variations in the mold cavity surface are controlled or eliminated by incorporating into the original molding material either reactive or inert additives, as discussed below, and selected to accommodate such dimensional or expansional variation without buckling or distorting of the mold surfaces.

Thus, it is believed that the principal force which causes such dimensional variation is thermal expansion of the sand granules in their tightly packed condition in the mold, with some release of bound water of hydration at the mold surface when contacted by the molten metal. When such released moisture permeates the mold away from the hot mold cavity surface and condenses on cooler sand granules somewhat removed from the cavity, the silicate bond may there be somewhat weakened by the condensed moisture and sufficiently to permit a surface layer to buckle into the mold cavity to cause an undesired distortion thereof. For example, if the gassed mold is dried thoroughly at relatively high temperatures of about 250° F. prior to casting molten metal, such buckling tendencies of convex mold surfaces do not arise to an appreciable or significant extent. Since it may not be desired to include such a drying step in commercial operations, such tendencies for certain convex mold surfaces to buckle during casting (which tendency is generally predictable from observing the pattern configuration in each case) can be reduced or controlled or eliminated for many shapes of casting by reducing somewhat the amount of water originally added in the coating step in the first place.

As illustrative of such a composition with reduced water content may be noted a formulation such as the example disclosed above but having about 8.06 parts of extra water added during the mixing step instead of the 16.2 parts previously disclosed. As will be understood, of course, the amount of bound water of hydration cannot be too greatly curtailed without sacrifice in the desired bond strength, but a reduction of about 10% in the total water content below the maximum amount of water which can be retained as water of hydration and still have a generally dry sand has been found to provide a substantial reduction in dimensional variation or expansion defects in the mold without appreciable damage to strength or initial accuracy, while a reduction in water content of as much as 20% causes an undesired or excessive accompanying diminution in bond strength.

Especially when utilizing formulations having a reduced amount of free water added thereto (and/or with other additives included in the free water as mentioned below), it is preferred to utilize a mixing technique in which only a portion of the sand is added first to the muller and then about half of the sodium hydroxide solution for several minutes mixing time before the silicate syrup is added and distributed, after which the rest of the sand and the remainder of the ingredients are added. As illustrative, considering the reduced water formulation noted above, satisfactory results are achieved by adding only about a third of the sand (3,000 parts by weight of the final composition) to the muller along with 16.5 parts (i.e., about half) of the 50% sodium hydroxide solution. After a couple of minutes mixing time, the 81.3 parts of silicate were added and mixed and distributed over the sand for an additional 5 minutes, after which the remainder of the sand was added and mixed for another couple of minutes, after which the 8.06 parts of water with 2 parts brown sugar dissolved therein were added to the muller and then the remaining 16.5 parts of 50% sodium hydroxide solution, after which mixing was continued until the sand was coated and the silicate material had hydrated to the desired dry condition—e.g., 22–23 minutes total mixing time—to produce a composition having about 1.81% binder solids and about 2.24% bound water of hydration based on the weight of coated sand.

In such a situation, a satisfactorily rapid mixing occurs with even distribution of the binder uniformly over the sand grains (to achieve desirable reproducibility of bond strengths from batch to batch) and is believed enhanced by adding only one-half the caustic initially to avoid the situation where adding the silicate into the entire amount of the caustic, might cause some crystalline precipitation of silicate hydrate in the early stages of mixing and prior to the desired distribution thereof over the individual sand grains.

As further illustrative of various formulations with which satisfactory results have been achieved in accordance herewith and at various oxide-acid ratios, there may be noted a coated molding composition in which about 1000 parts by weight of sand are introduced into a muller along with about 21.5 parts of 50% sodium hydroxide solution and the mixing action commenced. After about 2 minutes of mixing them, about 74.0 parts by weight of syrupy silicate (1:1.6) are added and the mixing continued for about another five minutes, at which time an additional 2000 parts of sand were added into the mixing apparatus. After about 2 more minutes of mixing time, an additional 21.5 parts of 50% caustic solution were added and the mixing continued for a total of 25–30 minutes while the materials reacted to form the desired hydrated coating on the sand with the muller still running. Thereafter the coated molding composition was dumped in desirably dry and free-flowing form with the hydrated silicate binder thereon having an oxide-acid ratio of about 1.35:1, and, thus, at the higher alkalinity portion of the range of alkalinity ratios preferred in accordance herewith.

Another example, at the lower alkalinity or more silicious portion of the preferred range, was prepared by introducing about 1000 parts of sand into the muller along with 13.8 parts of 50% sodium hydroxide solution and the mixing commenced. After about 2 minutes of preliminary mixing, 86.1 parts of the syrupy silicate were added and the mixing continued for an additional 5 minutes, at which time another 2000 parts of sand were added to the muller, followed after an additional 2 minutes of mixing by an additional 13.8 parts of 50% caustic solution. Mixing was continued for an additional 10–13 minutes during the hydrating reaction and until the coated sand appeared to be dry and free-flowing, at which time it was dumped for storage or use with an ultimate oxide-acid ratio of about 1:1.

If it is attempted to approach even more the low alkalinity or more highly silicious end of the disclosed ranges, it becomes more difficult to obtain rapid hydration of the coated sand in the muller. For example, a mass of coating material having a final oxide-acid ratio of 0.93:1 was prepared by adding 1000 parts of sand along with 11.3 parts of 50% caustic and mixing for about 2 minutes, at which time 93.4 parts of silicious syrup were added, with another 2000 parts of sand added after which an additional 5 minutes mixing time and another 11.3 parts of caustic solution after 2 or 3 minutes. Although mixing was continued for a total of about 30 minutes while the hydration reaction proceeded, the sand was still sticky and somewhat gummy, although uniformly coated, when it was dumped from the mixing apparatus. Because of the highly silicious nature of this example, hydration continued somewhat slowly in the mixed sand even after the mixing was stopped and, within about one hour and a half, the hydration had proceeded to a point where the sand was adequately dried and free-flowing.

As will be understood from the foregoing, such extremely low alkaline ratio materials are satisfactory for use herewith, but the longer mixing time and other considerations may indicate that they are not preferred for many commercial or mass production situations. It has also been observed, regarding the ability of silicate coatings on the sand granules to hydrate quickly to the desired dry and free-flowing condition, that quite a sharp and perhaps critical change in this facility occurs in the vicinity of an oxide-acid ratio of 1:1, although, as noted, quite satisfactory results in accordance herewith are achieved with binder composition at lower than this alkalinity ratio as well as, of course, with those of a more alkaline nature.

In particular situations where, for reasons of a particular mold configuration or otherwise, thermally induced dimensional variations during the casting step are not adequately controlled merely by reducing the amount of water as above noted, a variety of additive materials are satisfactorily used in accordance herewith for controlling or accommodating or eliminating such dimensional variations, although, as will be understood, the addition of substantial proportions of any additive material may result in a sacrifice or diminution of bond strength. Inert additives (such as wood flour, alpha cellulose, etc., which may be said to function as somewhat of a cushioning diluent among the sand particles subject to thermal expansion) successfully reduce such dimensional variations, although with quite marked sacrifices in bond strengths.

Other additives which may be decomposed or destroyed by the heat of the molten metal (so as to provide some additional room for thermal expansion of the sand grains) are preferred, and especially such additives which can be included in the original composition as dissolved in water or so as to form an integral part of the coating over each of the sand grains. As will be understood, any such additive must not interfere chemically with the formation or maintenance of the silicate hydrate on the sand grains in the first place and must be compatible with the silicate binder materials so as not to react adversely therewith. Similarly it should not be reactive with the molten metal poured against the mold cavity surface during casting, and should not interject shrinkage or expansion dimensional variations in the molding material itself during or after the gassing step.

As illustrative of a material which satisfactorily meets the foregoing criteria, urea may be noted, which material, in amounts of about 0.75% by weight of the coated sand, has been found to be generally effective in eliminating sand expansion defects during the casting step and virtually independently of the degree of compaction of the sand when making the mold. Substantially less than this amount may not provide the full effect desired, and amounts up to about 2% can be added without excessive sacrifices of bond strength. Preferably the urea is dissolved in the free water added to the original formulation in the muller, and when using urea or any of the other additives noted, the maximum amount of water which can be hydrated is preferable, both to assure adequate bond strength and because the presence of the additives accommodates dimensional variations without reducing the amount of water in the finished mold.

Although 0.75% urea produces satisfactory results in the control of thermal expansion defects, the decomposition of this much urea during the metal casting step produces an appreciable quantity of undesired or obnoxious fumes in the casting area, especially when a large number of molds are being poured concurrently, so that this technique may not be preferred in some instances. In such instances other materials which have fairly low decomposition temperatures (so as to decompose promptly upon heating to accommodate initial sand expansion) and which otherwise may modify the water present in the binder in the manner of urea may also be used. Dicyandiamide and melamine, for example, are illustrative of such satisfactory materials, although the present cost thereof is substantially higher than urea and may thus not be preferred. Also, the latter materials, being fairly insoluble, are added as a solid powder in the mixing steps.

The amount of urea can be reduced to about 0.25% or less by weight of the sand, while still satisfactorily obtaining the dimensional variation accommodation desired, by utilizing a supplemental additive therewith, such as 0.5% sodium nitrate, for example. Although extremely effective in dimensional variation control when utilized with urea, sodium nitrate itself has a tendency to increase the sensitivity of the hydrated silicate binder to reaction with carbon dioxide. This tendency can be adequately controlled by increasing somewhat the alkalinity ratio of the silicate binder in instances where sodium nitrate is used, but it is not preferred to utilize more than about 0.75% in any event in view of interference with the original desired hydration in the mixing step and increased sensitivity of the coated sand to even atmospheric carbon dioxide or moisture prior to use in the mold making and gassing steps. Indeed, in large scale commercial operations, it may be desirable to prepare and store the coated sand at a point somewhat removed from the area in which molds are being gassed, especially if sodium nitrate is present as an additive in the binder, because the increased level of carbon dioxide in the ambient atmosphere in the area of the gassing step may be sufficient to have some undesired effects on the coated sand even prior to use.

As illustrative of a composition with which satisfactory results are achieved herewith and as containing sodium nitrate and urea as thermal expansion control additives, one may note a formulation including 1000 parts by weight of silica sand, 10 parts of 50% sodium hydroxide solution, 26.13 parts of syrupy silicate (oxide-acid ratio of about 1:1.6), 5.38 parts water in which are dissolved 5 parts sodium nitrate and 2.5 parts urea (with the solution added to the sand at a temperature of approximately 150° F.). In the preparation of coated sand from such starting materials, about ⅓ of the sand is introduced into the muller along with about half of the sodium hydroxide solution and the mixing is started. After a couple of minutes of mixing, the silicate syrup is added, and, about 5 minutes later, the remainder of the sand. A couple of minutes later the water solution of sodium nitrate and urea is added to the muller and then the remainder of the sodium hydroxide. Mixing is continued until the resulting sand is dry and free-flowing as desired—for example, for about 28–35 minutes total mixing time.

In some circumstances, it has been observed that an intimate mixture of sodium nitrate and urea in the mass of molding composition may tend to deliquesce appreciably with resulting disadvantages in the coated composition during storage and/or prior to use. Particularly may this be noticeable when rather large batches of coated sand are prepared at one time. Such deliquescent effect does not, however, occur appreciably upon the incorporation of either sodium nitrate or urea alone, and it is therefore preferred in such situations, to add these additives separately and/or in a condition where they will remain separate in the coated molding composition. For example, if about 0.25% sodium nitrate by weight of the sand is added to the materials during mixing and dissolved in the added water for direct incorporation in the coating on the sand grains, and then urea in dry crystalline form is added to the dry coated sand at the end of the mixing step, such deliquescent disadvantages are eliminated. As will be understood, with such a technique, the urea is uniformly mixed through the batch of coated granules but in dry crystalline form, rather than as one of the components of the coating on each granule. Of course, the converse may be utilized with the urea added in solution to the coating mixture with sodium nitrate crystals being later incorporated into the dried product, but such technique may not be preferred because distinct grains or crystals of sodium nitrate may cause pitting in the surface of the casting ultimately formed in the mold, while urea crystals appear not to have a similar effect. As will be noted, this technique of separate addition of additives (or of having only one of the additives in solution during the mixing step) not only permits a somewhat reduced quantity of sodium nitrate for satisfactory results, but also permits the utilization of such additives in a formulation having the reduced or less than maximum amount of bound water without the above noted undesirable sacrifice in bond strength and/or without requiring additional amounts of water merely for solvent purposes during mixing.

As will be apparent from the foregoing, then, techniques and compositons are provided in accordance herewith for utilization and realization of enhanced commercial and practical advantages with silicate coated granular refractory molding compositions and, particularly, in the low alkalinity ratios providing a reduced tendency to absorb atmospheric moisture during storage, reduced temperatures during mixing and gassing, reduced brittleness of the final bond, and increased and more efficient utilization of carbon dioxide during the gassing step and under atmospheric conditions. Limiting the original water addition in the mixing step to avoid a quantity of water beyond that which can be chemically or physically absorbed or adsorped as water of hydration eliminates any necessity for heated or forced drying prior to addition of the coated material, while the utilization and separate additions of highly silicious or syrupy silicate materials and sodium hydroxide for reaction therewith after distribution on the refractory grains produces uniform coatings on the grains in readily achieved fluid condition prior to precipitation of the ultimately desired crystalline hydrate. Although such precise controls, especially of the amount of water, give enhanced results regarding dimensional changes and the like during molding or storage, some compromise in the areas of final bond strength and/or thermal stability may be encountered, but these compromises are accommodated or compensated for by the utilization of certain additives and other techniques in the particular foundry or commercial conditions where desired or necessary.

While the methods and compositions herein described constitute preferred embodiments of the invention, it is to be understood that the invention is not limited to these precise methods and compositions, and that changes may be made therein without departing from the scope of the invention which is defined in the appended claims.

What is claimed is:

1. In the method of forming a dry hydrated crystalline silicate coating on individual grains of a granular refractory material for making foundry molds in which said silicate coating is activated into a firm adhesive bond by reaction with carbon dioxide and in which said hydrated silicate coating has a predetermined final ratio of $Na_2O$ to $SiO_2$, the steps which comprise admixing with said granular refractory material a silicate syrup having an $Na_2O$–$SiO_2$ ratio substantially more silicious than said predetermined final ratio of said coating, uniformly distributing said silicate syrup over the surface of individual grains of said granular refractory substantially at room temperature, thereafter admixing a concentrated water solution of sodium hydroxide, effecting reaction between said silicate syrup and said sodium hydroxide on said individual grains of said granular refractory forming said hydrated silicate coating thereon with the said final $Na_2O$–$SiO_2$ ratio, and continuing said mixing until said reaction is complete forming said hydrated silicate coating on said grains to provide an essentially dry and free-flowing mass of coated granular refractory.

2. In the method of forming a dry hydrated crystalline silicate coating on individual grains of a granular refractory material for making foundry molds in which said silicate coating is activated into a firm adhesive bond by reaction with carbon dioxide and in which said hydrated silicate coating has a predetermined final ratio of $Na_2O$ to $SiO_2$ within the range between 0.8:1.0 and 1.4:1.0, the steps which comprise admixing with said granular refractory material a water solution of a silicate syrup having an $Na_2O$–$SiO_2$ ratio substantially more silicious than said predetermined final ratio of said coating, uniformly distributing said silicate syrup over the surface of individual grains of said granular refractory substantially at room temperature, thereafter admixing a concentrated water solution of sodium hydroxide, limiting the total quantity of water added with said water solutions to substantially no more than the total quantity of bound water of hydration in said final hydrated silicate coating, effecting reaction between said silicate syrup and said sodium hydroxide on said individual grains of said granular refractory forming said hydrated silicate coating thereon with said final $Na_2O$–$SiO_2$ ratio, and continuing said mixing until said reaction is complete forming said hydrated silicate coating on said grains to provide an essentially dry and free-flowing mass of coated granular refractory.

3. The method as recited in claim 2 in which said total quantity of water added during said admixing and distributing steps is limited to substantially less than said total quantity of bound water of hydration.

4. The method as recited in claim 2 in which said final ratio of $Na_2O$ to $SiO_2$ in said dry hydrated silicate coating is within the range between 1.0:1.0 and 1.3:1.0.

5. The method of coating individual grains of a granular refractory foundry mold material to form thereon a dry hydrated silicate coating by the reaction on said grains of a silicate reactant substantially fluent and non-crystalline at room temperature and a water solution of a concentrated caustic reactant, the steps which comprise introducing said granular refractory material into a mixing zone for continued mechanical agitation and mixing therein, introducing one of said reactants into said mixing zone for intermixing with said granular refractory and uniform distribution of said reactant over the surfaces of individual grains thereof, thereafter introducing into said mixing zone said other reactant for distribution over the surfaces of said individual grains of said granular refractory, and effecting reaction between said two reactants on said individual grains for precipitating thereon said silicate coating and effecting hydration thereof to said dry hydrated state forming a dry and free-flowing mass of said coated granular refractory.

6. The method as recited in claim 5 in which said hydrated silicate coating on said granular refractory tends to lose water of hydration at elevated temperatures, and which method also includes the step of cooling said mixing zone and said sand and reactants therein for maintaining said granular refractory and said reactants and coating thereon at a temperature less than the temperature at which said bound water of hydration is lost from said hydrated silicate coating.

7. The method as recited in claim 6 in which said mixing zone and said granular refractory and said reactants therein are maintained at a temperature of less than 110° F. throughout said mixing and reacting steps.

8. The method as recited in claim 6 in which said mixing zone and said granular refractory and said reactants therein are maintained at a temperature of no more than about 85–95° F.

9. The method as recited in claim 5 in which the quantity of said dry hydrated silicate coating formed on said grains of said granular refractory material is within the range of about 1% to 2% coating solids by weights of said coated granular refractory material when said material is silica sand.

10. The method as recited in claim 5 in which the quantity of said dry hydrated silicate coating formed on said grains of said granular refractory material is within the range of about 1.0% to 1.5% when the particle size of said granular refractory material is about 50 mesh and is about 1.5% to 2.0% when the particle size of said granular refractory is about A.F.S. #100, in terms of weight of coating solids to weight of coated granular refractory material, and when said material is silica sand.

11. The method of coating individual grains of a granular refractory foundry mold material to form thereon a dry hydrated silicate coating by the reaction on said grains of a water solution of a silicate reactant substantially fluent and noncrystalline at room temperature and a water solution of a concentrated caustic reactant the steps which comprise introducing said granular refractory material into a mixing zone for continued mechanical agitation and mixing therein, introducing one of said reactants into said mixing zone for intermixing with said granular refractory and uniform distribution of said reactant over the surfaces of individual grains thereof, thereafter introducing into said mixing zone said other reactant for distribution over the surfaces of said individual grains of said granular refractory, effecting reaction between said two reactants on said individual grains for precipitating thereon said silicate coating and effecting hydration thereof to said dry hydrated state, and limiting throughout said introducing and mixing steps the total amount of water added into said mixing zone and with said two reactants to an amount no greater than the total amount of water bound as water of hydration during said hydration of said silicate coating forming a dry and free-flowing mass of said coated granular refractory.

12. The method as recited in claim 11 in which said total amount of water added into said mixing zone is limited to substantially less than the maximum amount of water capable of being bound as water of hydration in said finished and dry hydrated silicate coating.

13. The method as recited in claim 12 in which said total amount of water is limited to about 10% to 20% less than the maximum amount of water capable of being bound as water of hydration in said finished and dry hydrated silicate coating.

14. The method of making metal casting molds and the like which comprises coating individual grains of a granular refractory material with a gas activatable alkali silicate potential binder forming a dry surface on said grains whereby the granular material has substantially no green strength but the grains thereof move readily over one another so that the material readily forms a talus slope when laterally unsupported and the granular material is dry and pourable so as to conform to a pattern surface when poured thereon, said binder having at least at the exposed surfaces of said coatings an alkali silicate compound carrying chemically bound water of hydration and an $Na_2O$–$SiO_2$ ratio within the range between about 0.8:1.0 and 1.4:1.0, keeping said granular material dry until formed into said molds, forming it by pouring onto a pattern surface, permeating the resulting mass on the pattern under atmospheric conditions with a reagent gas including carbon dioxide which reacts with said hydrated compound releasing water into said coating on the surfaces of the grains, and activating said silicate binder to bond said grains at points of contact thereamong and converting the loose granular mass into a coherent mold body with surface corresponding to that of the pattern, removing the resulting mold body from the pattern, and repeating the process with the same pattern.

15. The method as recited in claim 14 in which said mass of coated granular refractory material on said pattern is substantially enclosed for said permeating with said reagent gas, and in which said carbon dioxide in said reagent gas is supplied to said enclosed mass of refractory material at a pressure within the range of about 0.5–2.25 p.s.i.g.

16. The method as recited in claim 14 in which said mass of coated granular refractory material on said pattern is substantially enclosed for said permeating with said reagent gas, and in which a substantial flow of said reagent gas is maintained throughout said permeating step.

17. The method as recited in claim 14 in which said permeating with said reagent gas is continued for a length of time within the range of about 0.5–3 minutes and until said activated silicate binder binds said coated grains into self-sustaining but plastic coherence, and in which said mold body is removed from said pattern after said permeating with said reagent gas and prior to activation of said silicate binder into a rigid and non-plastic bond.

18. In a method of forming a gas permeable bonded casting mold and a mold surface thereon accurately representing the surface of a pattern, the combination of steps comprising forming a dry mixture of granular refractory material with a water-activatable sodium silicate binder which, although dry so that individual grains can move freely on one another, contains bound water releasable by reaction with carbon dioxide gas whereby to activate said binder, said silicate binder having an $Na_2O$–$SiO_2$ ratio within the range between about 0.8:1.0 and 1.4:1.0 and being present in an amount of from about 1% to 2% of binder solids by weight of said mixture, keeping the mixture dry so that it is pourable at the time of use, pouring and compacting the resulting dry granular mixture onto the surface of a pattern, permeating the granular mass thus formed, while on the pattern and under atmospheric conditions, with said carbon dioxide gas whereby to release said bound water and thereby to activate said binder to bond adjacent grains in contact therewith, and removing from said pattern the resulting bonded mold when it is bonded into a coherent and self-sustaining mold body, and repeating the process with the same pattern.

19. The method as recited in claim 18 in which shrinkages tend to occur in said dry granular mixture during said permeating step, and which also includes enclosing said dry granular mixture on said surface of said pattern during said permeating with said carbon dioxide, and maintaining on said enclosed granular mixture during said permeating step a compacting mechanical pressure for minimizing shrinking during activation of said binder to achieve and maintain dimensional stability of said self-sustaining mold formed on said pattern.

20. In a method of preparing silicate coated granular refractory material for bonding into a compacted and self-sustaining foundry mold for receiving molten metal cast thereinto and in which undesired thermal expansion dimensional variations are induced in said compacted refractory material bonded into said foundry mold during said metal casting, the steps which comprise admixing said granular refractory material with a silicate binder forming a silicate binder coating on individual grains of said granular refractory material, hydrating said silicate binder on said refractory grains forming an essentially dry and free-flowing mass of coated refractory material with which to form said compacted foundry mold, said hydrated silicate binder on said granular refractory material being activatable to release water of hydration in said silicate binder effecting bonding of said granular refractory material into said foundry mold, and incorporating into said silicate coated granular refractory material and evenly distributed therethrough an expansion compensating component selected from the group consisting of urea, dicyandiamide and melamine for reaction at the temperatures of said molten metal casting to relieve internal thermal expansion stresses within said compacted and bonded foundry mold for accommodating said thermal expansion of said bonded refractory material.

21. The method as recited in claim 20 in which said expansion compensating component is incorporated in said silicate coating on said individual grains of said granular refractory material.

22. The method as recited in claim 20 in which said expansion compensating component comprises urea and sodium nitrate.

23. The method as recited in claim 22 in which one of said urea and sodium nitrate expansion compensating components is added as a water solution during said mixing and hydration of said silicate coating on said granular refractory material and the other of said expansion compensating components is intermixed in solid crystalline form with said mass of silicate coated granular refractory material after said hydration of said silicate coating thereon.

24. A dry free-flowing and pourable granular refractory composition for forming foundry molds for metal casting upon pouring over a pattern, said composition having substantially no measurable green strength and being activatable by carbon dioxide gas to form a bonded and compacted self-sustaining and solid foundry mold, which composition comprises granular refractory material individual grains of which are coated with a dry crystalline alkali metal silicate binder having releasably bound water of hydration, said silicate binder having an $Na_2O$–$SiO_2$ ratio within the range of between about 0.8:1.0 and 1.4:1.0, and being present on said granular refractory material in an amount within the range of about 1% to 2% binder solids by weight of said coated granular refractory, and said composition containing substantially no free water in addition to said bound water of hydration in said silicate binder.

25. The composition as recited in claim 24 in which said $Na_2O$–$SiO_2$ ratio is within the range of between about 1.0:1.0 and 1.3:1.0.

26. The composition as recited in claim 24 in which the total quantity of said bound water of hydration in said composition is about 10% less than the maximum stoichiometric amount of water which can be chemically bound as water of hydration at atmospheric conditions by said silicate binder on said granular refractory material.

27. A dry free-flowing and pourable granular refractory composition for forming foundry molds for metal casting upon pouring over a pattern, said composition having substantially no measurable green strength and being activatable by carbon dioxide gas to form a bonded and compacted self-sustaining and solid foundry mold, which composition comprises a mass of granular refractory material individual grains of which are coated with a hydrated crystalline alkali metal silicate binder activatable to bonded adhesiveness by carbon dioxide and having an $Na_2O$–$SiO_2$ ratio within the range of between about 0.8:.01 and 1.4:1.0 and present as coated on said grains in an amount within the range of about 1% to 2% binder solids by weight of said coated granular refractory, and an expansion compensating component distributed throughout said composition for accommodating thermal expansion of said granular refractory material at high metal casting temperatures when said refractory material is compacted and bonded into a self-sustaining foundry mold, said expansion compensating component being selected from the group consisting of urea, dicyandiamide and melamine.

28. The composition as recited in claim 27 in which said expansion compensating component is included in said silicate binder coating on said individual grains of said granular refractory material.

29. The composition as recited in claim 27 in which said expansion compensating material comprises urea in an amount of from about 0.5% to 2.0% by weight of said coated granular refractory.

30. The composition as recited in claim 27 in which said expansion compensating component includes about 0.25% urea and about 0.5% sodium nitrate.

31. The composition as recited in claim 27 in which said expansion compensating component includes about equal parts of urea and sodium nitrate in the range of about 0.25% each, with one of said substances being included in said silicate binder coating on said individual grains of said granular refractory material and the other of said substances being distributed throughout said mixture in substantially dry crystalline form.

32. The composition as recited in claim 31 in which said sodium nitrate is the one of said substances included in said silicate binder coating and said urea is distributed throughout said refractory mass in said dry crystalline form.

References Cited by the Examiner

UNITED STATES PATENTS

| | | | |
|---|---|---|---|
| 1,889,007 | 11/1932 | Wallace | 106—38.3 |
| 2,292,199 | 8/1942 | Carter | 106—74 XR |
| 2,499,729 | 3/1950 | Daussan | 106—38.3 |
| 2,824,345 | 2/1958 | Zifferer | 106—38.3 |
| 2,926,098 | 2/1960 | Ilenda et al. | 106—84 XR |
| 2,947,641 | 8/1960 | Bleuenstein | 106—38.3 |
| 3,074,802 | 1/1963 | Alexander et al. | 106—38.3 |

ROBERT F. WHITE, *Primary Examiner.*

ALEXANDER H. BRODMERKEL, *Examiner.*